Jan. 10, 1967 D. HALE ET AL 3,297,731
METHOD OF PELLETIZING AND EXTRACTING OILS FROM
OLEAGINOUS COMMINUTED MATTER
Filed May 6, 1963

Douglas Hale,
George J. Lang,
Henry J. James,
Inventors.
Koenig, Pope, Senniger, and Powers,
Attorneys.

3,297,731
METHOD OF PELLETIZING AND EXTRACTING OILS FROM OLEAGINOUS COMMINUTED MATTER
Douglas Hale, Creve Coeur, George T. Lanz, Kirkwood, and Henry T. James, Warson Woods, Mo., assignors to Ralston Purina Company, St. Louis, Mo., a corporation of Missouri
Filed May 6, 1963, Ser. No. 278,314
1 Claim. (Cl. 260—412.8)

This invention relates to the treatment of particles, and more particularly to a method of extracting oleaginous matter from comminuted organic particles, such as animal and vegetable meals, and the like.

Among the several objects of this invention may be noted the provision of a method of extracting oleaginous matter or fat content from comminuted organic particles to reduce the volume of the particles thereby permitting storage in a minimum of space; the provision of such a method for reducing the potential fire hazard in the comminuted particles, the oleaginous matter being of a somewhat combustible nature and the removal thereof removing a potential fire hazard; the provision of such a method for removing the fat content of pellets to reduce the tendency of the pellets to crumble or disintegrate during shipment; and the provision of a method such as described which may be carried out by means of relatively simple equipment which is reliable and convenient to control. Other objects and features will be in part apparent and in part pointed out hereinafter.

The invention accordingly comprises the methods hereinafter described, the scope of the invention being indicated in the following claim.

Heretofore, in the extraction of oleaginous or fatty matter from finely divided or comminuted particles, the particles have been subjected to the solvent before being formed into pellets. It has however been found that solvent passing through the finely divided particles tends to channel or flow in uneven patterns so that an unequal distribution of the solvent is obtained in the finely divided particles. One reason for the unequal distribution is that finely divided particles, such as meal particles, tend to pack together which will cause an uneven draining of solvent through the particles. Such a method of extraction results in an inefficient utilization of the solvent with certain areas of the comminuted particles being subjected to an excessive amount of solvent and other areas of the comminuted particles being subjected to an insufficient amount of solvent.

Figure 1:
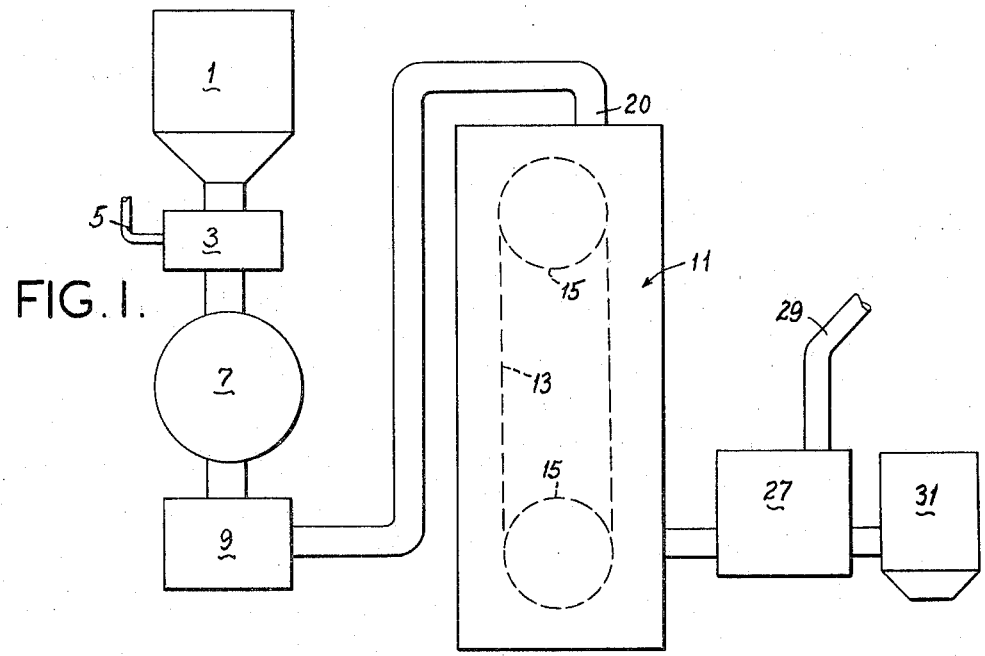
Figure 2:
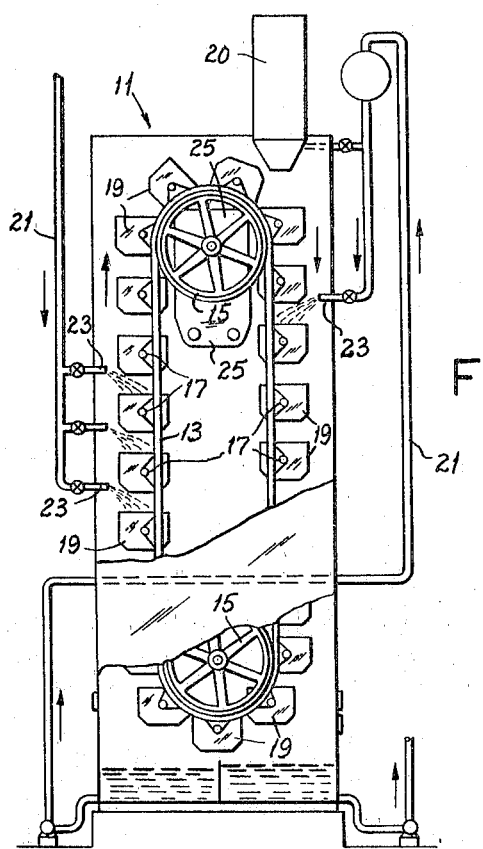

In the accompanying drawings, in which one of various possible embodiments of the invention is illustrated, FIG. 1 is a flow chart illustrating the method of the present invention; and FIG. 2 is an enlarged section of the conveyor shown in FIG. 1.

Corresponding reference characters indicate corresponding parts throughout the several views of the drawings.

According to the present invention, a substantially uniform extraction of oily or oleaginous matter from comminuted particles is accomplished by forming the finely divided particles into pellets before the solvent is applied. Varying amounts of oil or oleaginous matter may be removed from the pellets depending on the amount and type of solvent used.

The comminuted organic particles, for example, may be animal and vegetable meals, such as fish meal, sesame meal, and poultry meal. Meat scraps, fish scraps, and poultry scraps, may also be employed with this method. A binder, such as water or steam is added to the comminuted organic particles.

Referring to the drawings, a supply bin 1 is shown for the comminuted organic particles to be pelleted. The particles are fed by gravity to a cooker or conditioner 3. A steam connection 5 to conditioner 3 may be provided for moistening and conditioning the particles, such as meal, for proper pelleting. The particles are conditioned, for example between about 30 seconds and five minutes in conditioner 3 and a moisture content of approximately 14% is obtained.

The conditioned particles flow or are fed through a pellet mill 7. Pellet mill 7 is conventional and under pressure produces, for example, short cylindrical pellets between about ⅛ of an inch and ½ inch in diameter, and from about ⅛ inch to several inches in length. Other shapes or pellets, such as rectangular or oval, are employed depending upon the pelleting characteristics of the pellet mill. During the pelleting process in pellet mill 7, the particles are squeezed through dies which compress and heat the particles. Strands or lengths of compressed particles are automatically cut to pellet length. As the pellets are ejected or discharged from the pellet mill, they are in the form of a tacky, moist, plastic material.

The pellets are in a heated condition, such as around 180° F., when ejected from the pellet mill and are then passed through a cooler or dryer 9. A blast of air cools the pellets to ambient temperature in dryer 9. The moisture content, for example, in the pellets is between about 9% and 11% upon leaving the dryer.

From dryer 9, the pellets pass to an extractor tower 11 If desired, the pellets may be cracked into fractional pelleted form before being fed to extractor tower 11, the fines and other undesirably small particles being eliminated or removed by passing the particles over a sieve or screen of suitable mesh, such as a 16 mesh Tyler sieve. In either event, the term pellet includes the cracked or crumbled pellet fragments as well as the whole pellets. A conveyor 13 is mounted on pulleys 15 and suitable drive means (not shown) drive conveyor 13. Pivoted on support rods 17 secured to conveyor 13 are baskets or receptacles 19. Pellets are loaded from the top of tower 11 by discharge from chute 10 into baskets 19. A solvent, such as hexane at a temperature of 130° F., is supplied through supply pipes 21. Nozzles 23 spray the solvent onto the pellets in baskets 19. The solvent is absorbed by the pellets in a generally uniform manner and dissolves the fat content in the pellets. The pellets are subjected to a predetermined amount of solvent for a predetermined time depending on the amount of the fat content desired to be removed from the pellets. Baskets 19 have perforated bottoms and the solvent drains through the pellets and drops to the bottom of tower 11. The pellets are dumped from baskets 19 into a hopper 25 at a temperature of about 100° F. Baskets 19 remain in a vertical upright position during their entire travel except when pivoted or dumped into hopper 25 and thereafter return to upright position to receive pellets from chute 20. To remove the absorbed solvent from the pellets, the pellets are next fed to a heater or desolventizer 27 to heat the pellets at a temperature of about 180° F. for a period of 15 minutes. Heater 27 includes a steam connection 29 for supplying steam to remove the absorbed solvent. The solvent and dissolved fat content are separated in a conventional manner utilizing standard evaporators and strippers at a temperature of around 250° F. finishing with a vacuum of 28 inches of mercury.

The pellets pass from desolventizer 27 to a container or bin 31. The pellets may be next passed from bin 31 to suitable packaging apparatus or to conventional grinding apparatus for grinding the pellets into a desired size.

As a specific example, fish meal was employed having the following composition:

| | Percent by weight |
|---|---|
| Moisture | 9.0 |
| Protein | 62.0 |
| Fat | 9.5 |
| Fiber | .5 |
| Ash | 19.0 |

The fish meal had the following particle sizes:

W.W. Tyler sieve-standard
| meshes per inch: | Percent |
|---|---|
| On 8 | 16 |
| On 16 | 23 |
| On 32 | 25 |
| On 42 | 10 |
| On 100 | 18 |
| On Pan | 8 |

Meal of the above composition was fed to conditioner 3 where is was conditioned at 200° F. for a period four minutes resulting in a 14% moisture content. Next, the conditioned meal was fed by gravity to pellet mill 7 and cylindrical pellets of ⅛ inch in diameter and 1 inch in length were formed in a moist, plastic condition. The pellets were cooled in dryer 9 to ambient temperature and firm, glossy pellets were thus formed having less than 1% fines. The pellets were passed to extractor tower 11 and hexane at a temperature of 130° F. was applied to the pellets for a 90-minute period to remove the fat content. Next desolventizer or heater 27 heated the pellets to 180° F. for a 15-minute period to remove the hexane and the dissolved fat content from the pellets. Pellets discharged from heater 27 had less than ½% fat content remaining in the pellets.

A reduction in volume of over one-half in the fish meal in the above example was obtained by removing the fat content and forming the meal in pelleted form.

In view of the above, it will be seen that the several objects of the invention are achieved and other advantageous results attained.

As various changes could be made in the above methods, without departing from the scope of the invention, it is intended that all matter contained in the above description or shown in the accompanying drawings, shall be interpreted as illustrative and not in a limiting sense.

What is claimed is:

The method of extracting the fat content from conminuted fish particles comprising moistening the comminuted particles with steam until the moisture content thereof is approximately 14%, pelletizing the moistened particles to form pellets, heating the pellets and then cooling and drying them to a moisture content of about 9–11%, spraying hexane at a temperature of about 130 F. on the pellets, separating the hexane and the pellets, and heating the pellets so separated to a temperature of approximately 180° F.

References Cited by the Examiner

UNITED STATES PATENTS 2,448,729   9/1948   Ozai-Durrani ___ 260—412.8 XR

CHARLES B. PARKER, *Primary Examiner.*

IRVING MARCUS, *Examiner.*

ANTON H. SUTTO, *Assistant Examiner.*